United States Patent [19]

Metraux

[11] Patent Number: 5,033,522
[45] Date of Patent: Jul. 23, 1991

[54] ANTI-SKID DEVICE FOR VEHICLE WHEELS WITH AUTOMATIC POSITIONING BY SECURING MEMBERS

[75] Inventor: Michel Metraux, Pully, Switzerland

[73] Assignee: Autotyp S.A., Etagnieres, Switzerland

[21] Appl. No.: 494,814

[22] Filed: Mar. 15, 1990

Related U.S. Application Data

[63] Continuation of Ser. No. 261,210, Oct. 24, 1988, abandoned.

[30] Foreign Application Priority Data

Oct. 22, 1987 [DE] Fed. Rep. of Germany ....... 3735827

[51] Int. Cl.$^5$ .................. B60C 27/20; B60C 21/14
[52] U.S. Cl. .................. 152/213 A; 152/216; 152/218; 152/241; 301/40 R
[58] Field of Search ............... 152/208, 213 R, 213 A, 152/214, 216, 217, 218, 225 R, 233, 241; 301/40 R, 44 T, 44 R

[56] References Cited

U.S. PATENT DOCUMENTS

| 2,579,057 | 12/1951 | Traver | 152/241 |
| 2,584,625 | 2/1952 | Schwab. | |
| 4,388,754 | 6/1983 | Ilon | 152/216 |
| 4,799,522 | 1/1989 | Ilon | 152/218 |

FOREIGN PATENT DOCUMENTS

| 263433 | 4/1988 | European Pat. Off. . |
| 3545528 | 7/1987 | Fed. Rep. of Germany . |
| 2540443 | 8/1984 | France . |

Primary Examiner—Michael W. Ball
Assistant Examiner—Gregory J. Wilber
Attorney, Agent, or Firm—Foley and Lardner

[57] ABSTRACT

An anti-skid device for a vehicle is automatically positioned by securing members 50 which cause the device to pass from an installation position to the operating position in which an anti-skid assembly 70, such as a snow chain arrangement, is arranged on the peripheral surface of the tire 10. The anti-skid device comprises a principal annular section 30 fixed to the anti-skid assembly 70 by arms 40 and arranged in a manner such that the securing member 50 can be fixed to this annular section 30 and can move freely over the circumference thereof.

25 Claims, 4 Drawing Sheets

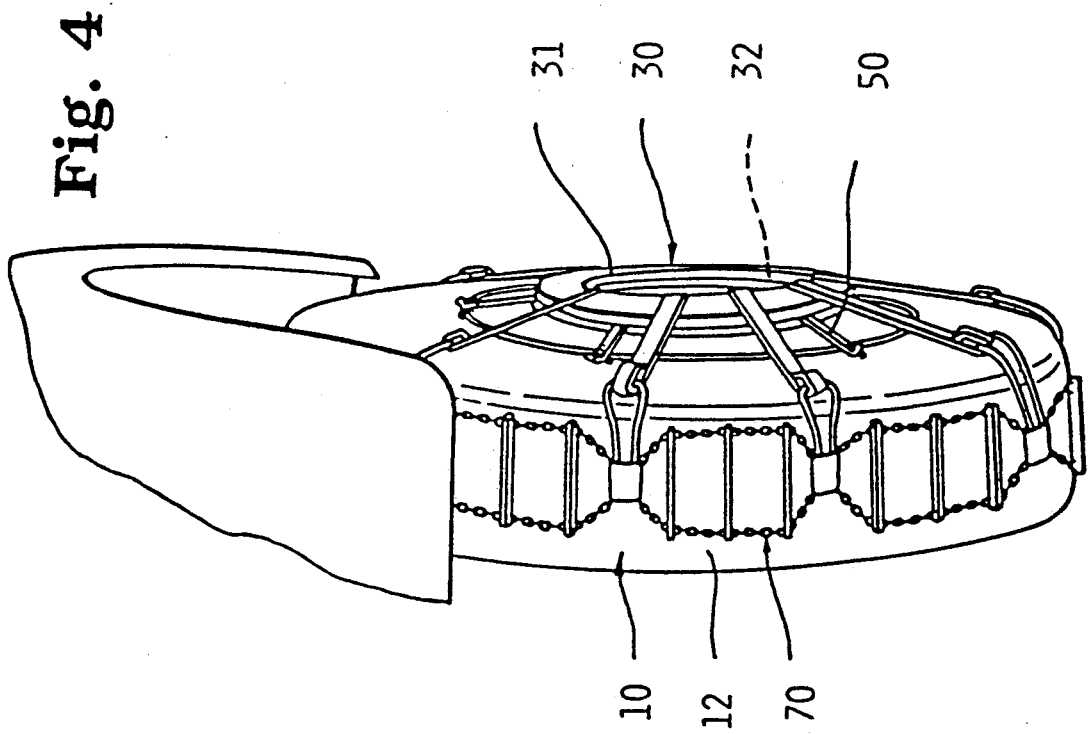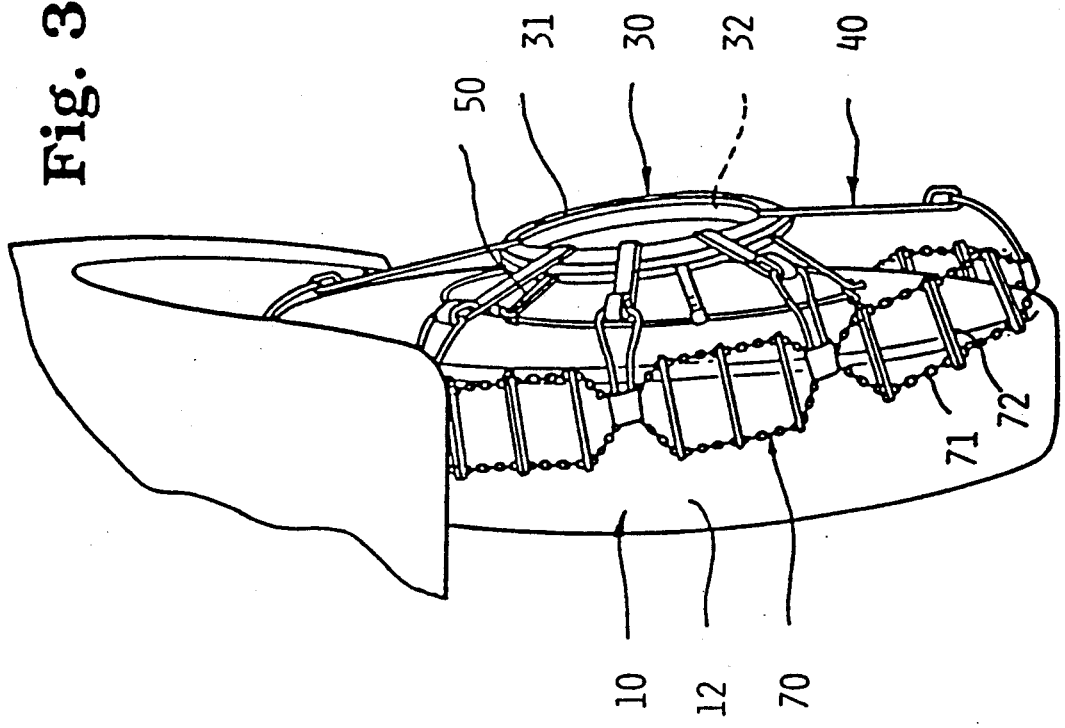

Fig. 5
Fig. 6
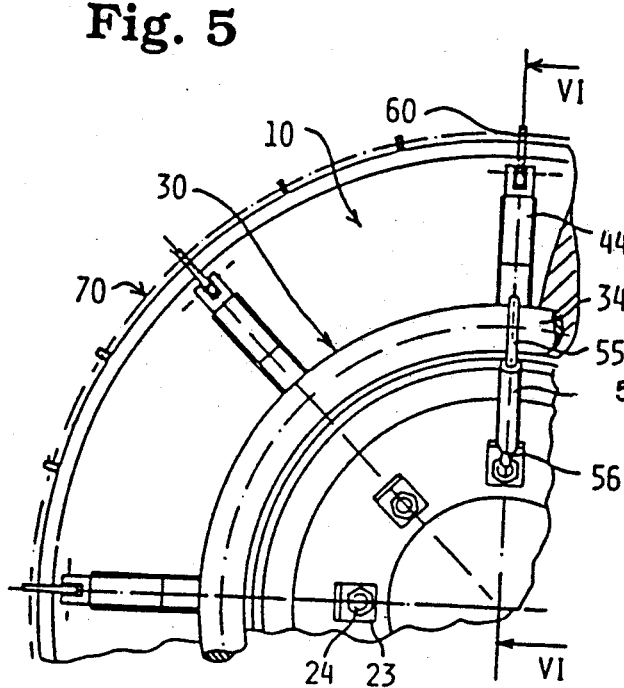
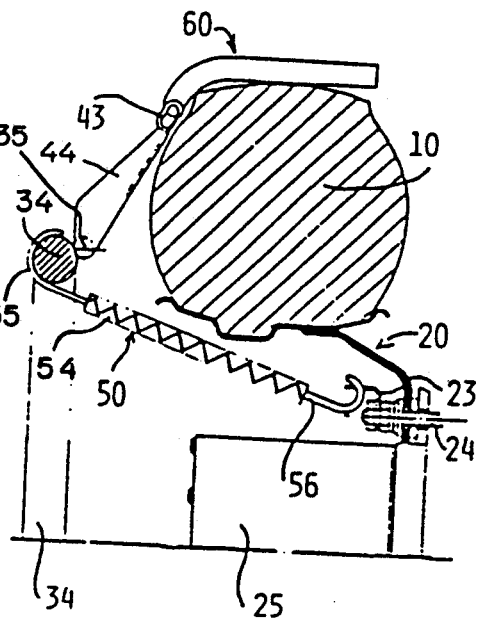
Fig. 7
Fig. 8
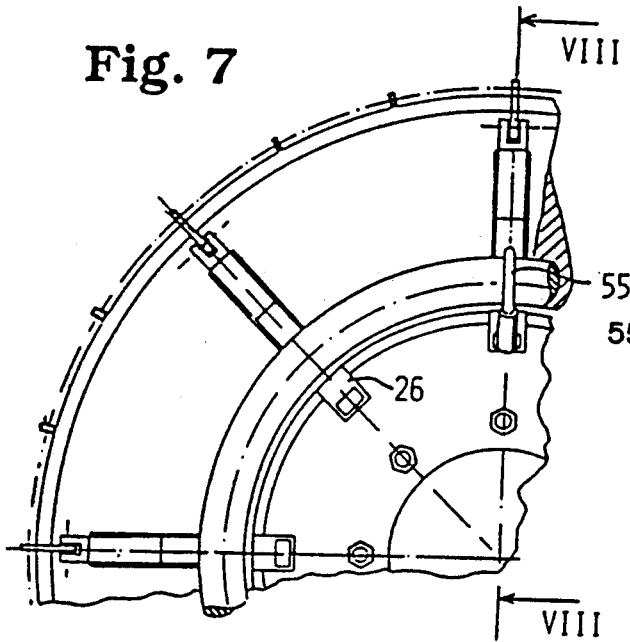
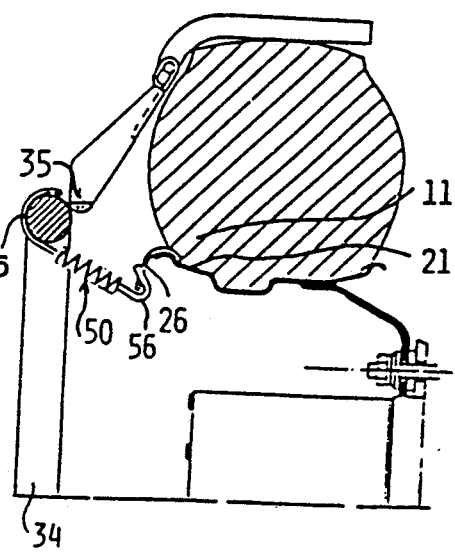

5,033,522

ANTI-SKID DEVICE FOR VEHICLE WHEELS WITH AUTOMATIC POSITIONING BY SECURING MEMBERS

This application is a continuation of application Ser. No. 07/261,210, filed Oct. 24, 1988 now abandoned.

BACKGROUND OF THE INVENTION

1. Field of the Invention

The present invention relates to anti-skid devices for wheels, and more particularly to a means for attaching snow-chains to vehicle wheels.

2. Discussion of the Related Art

It has already been proposed in French Patent reference No. 2,540,443 to use a series of radial arms fixed to anti-skid elements and mutually connected by a ring arranged on the outside of the wheel. This device is intended to prevent the displacement of the anti-skid members relative to the tire.

In addition, German reference No. 3,545,528 discloses anti-skid devices for vehicle wheels intended to be automatically positioned by means of securing members which cause the device to pass from an installation position on the outer side of the wheel to an operating position in which a snow chain is arranged on the peripheral surface of the tire.

In prior anti-skid devices of this type, the snow chain is retained by four arms capable of undergoing rotation relative to the securing members fixed to the wheel during the advance of the vehicle. In the majority of cases, these four arms are sufficient to pull the chain onto the wheel and to lock it solidly on the latter during the advance of the vehicle.

Nevertheless, it has been found that the four arms were not always sufficient to bring the snow chain onto the wheel and to secure it thereon. This defect is particularly frequent in the case of large-diameter wheels, such as wheels for heavy vehicles, since it is possible for the chain to slip between the arms outside the peripheral surface of the tire, or for it to be impossible for the chain to be brought into its position on the peripheral surface of the tire under the action of the restoring members.

SUMMARY OF THE INVENTION

An object of this invention is to ensure that the snow chain can be positioned properly onto the wheel even if the diameter of the wheel is large.

A further object of this invention is to provide an anti-skid device which remains in contact with the tire, even when driving at high speeds on poor roads or in particularly bad weather conditions.

According to the present invention, the foregoing and additional objects are attained by providing an anti-skid device for a vehicle wheel comprising at least one anti-skid means, detachable over the periphery of the wheel, and at least one retaining member capable of positioning the anti-skid assembly over the periphery of the wheel. A principal annular piece is fixed to the anti-skid assembly and arranged in a manner such that the retaining member can be fixed onto the annular piece and can move freely along the latter.

BRIEF DESCRIPTION OF THE DRAWINGS

FIG. 3 is a perspective view showing the device of FIG. 1 in the installation position;

FIG. 4 is a perspective view showing the device fitted on the vehicle wheel in the operating position;

FIG. 5 is a partial lateral view of a wheel equipped with a second embodiment of a device according to the present invention showing an alternative means of attaching the anti-skid device using restoring elements located between a principal ring and the lug nuts;

FIG. 6 is a section along VI—VI in FIG. 5;

FIG. 7 is a partial lateral view to FIG. 5, showing an alternative means of fixing an anti-skid device to the lip of the rim according to the present invention;

FIG. 8 is a section along VIII—VIII in FIG. 7;

DETAILED DESCRIPTION OF THE PREFERRED EMBODIMENTS

Figure 2:
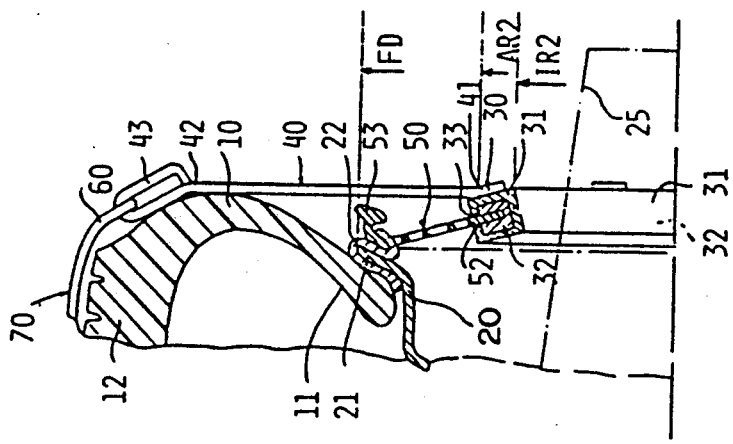
FIG. 2 is a partial section on a larger scale along II—II in FIG. 1.

As illustrated in FIGS. 1 to 4, the present invention comprehends an anti-skid device arranged on a vehicle wheel, comprising a tire 10 and a rim 20. The dimensions of a principal annular piece 30 of the anti-skid device are such that its external diameter AR2 is less than the diameter FD of an edge 21 of the rim 20 supporting the tire 10, while its internal diameter IR2 is greater than the diameter of a hub 25, shown diagrammatically in broken lines in FIG. 2, which thereby enables the device to be used even where the hub 25 of the wheel projects outward, as shown in the drawing.

Referring to FIG. 2, the principal annular piece 30 is formed of two annular hoops 31 and 32 of concentric sections capable of rotating relative to one another. The external hoop 31 is intended to interact with a plurality of radial arms 40 extending toward the periphery of the wheel while the inner hoop 32 is intended to interact with securing members 50 of the device. The dimensions of the hoops are a function of the load and of the total permitted laden weight of the vehicle concerned.

Figure 1:
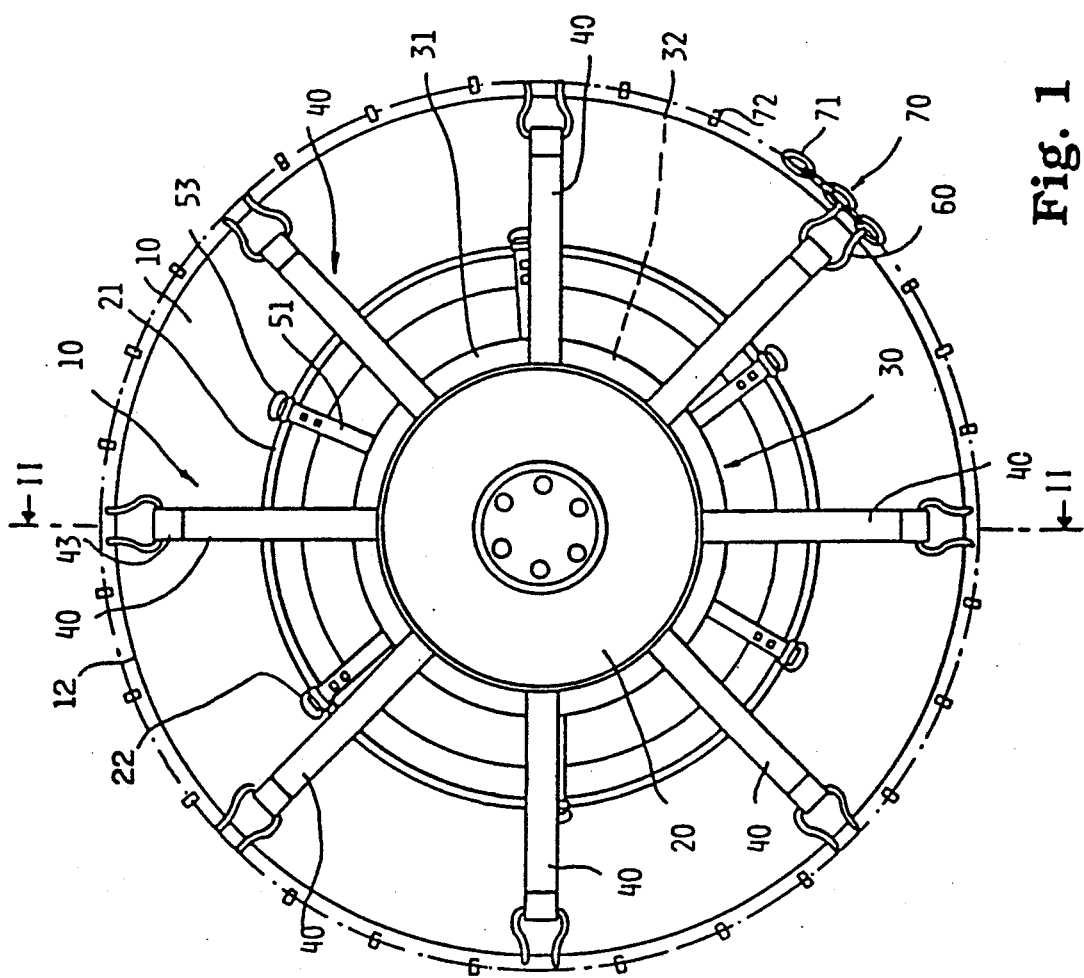
FIG. 1 is a lateral view of a wheel equipped with a first embodiment of a device according to the present invention.

In the embodiment shown in FIG. 1, eight radial arms 40 have been shown, a central end 41 of which is fixed, for example by welding, to the outer hoop 31. An outer end 42 is bent over to form an eye 43 intended to receive a ring of a chain guide 60. The chain guides 60 are inserted along the running surface 70 formed in a conventional manner by chains 71 and transverse bars 72 which, when the device is in position, surround the peripheral surface 12 of the tire. It should be noted that the radial arms 40 are profiled in a manner such as to match the general external shape of the tire.

As an alternative embodiment, it would be possible to install elements of the snow chain 71 directly on the outer hoop 31.

In FIG. 1, six securing members 50 have been shown, which are preferably distributed at regular intervals over the circumference of the hoop 32. These members may be formed of elastic stretchers 51, one end 52 of which is gripped in the inner hoop 32 and the other end 53 of which is fixed elsewhere in clips 22, which are generally S-shaped and are gripped between the lip 21 of the rim 20 and the adjacent part 11 of the tire 10. These securing members 50 are intended to pull the annular piece 30 towards the wheel.

As an alternative embodiment, it is possible to use a one-piece star-shaped securing member, whose central part forms the annular piece 32.

When the vehicle is in motion, the running surface 70 is displaced relative to the peripheral surface 12 of the tire, and it is for this reason that it is necessary to ensure relative movement between the two hoops 31 and 32. The outer hoop 31 also possesses an annular aperture 33 intended for the passage of the elastic members 51.

FIGS. 3 and 4 represent the process of installing the device of FIGS. 1 and 2. The running surface 70 of the anti-skid device is initially arranged on the upper part of the periphery 12 of the tire 10, while the lower part of the running surface 70, towards the road surface, remains near the part of the tire in contact with the ground. The device is then fixed to the wheel by means of securing members 50 which engage the clips 22 previously inserted between the lip 21 of the rim 20 and the adjacent part 11 of the tire 10. As soon as all the elastic securing members are fixed, they pull the device towards the wheel.

When the vehicle advances, the wheel rolls, the portion of the tire previously in contact with the ground is released, and after a number of rotations of the wheel, the anti-skid device is arranged over the entire peripheral surface of the tire, as shown in FIG. 4. It is retained in this position by means of securing members 50, both when stationary and during the rotation of the wheel.

Referring now to FIGS. 5 to 8, there is shown an alternative embodiment comprising a principal ring 30 formed by a single hoop 34 possessing, at regular intervals, fixing pins 35 for the radial arms 44. As before, the outer part of each arm 44 is fitted with a loop 43 to receive a chain guide 60. Moreover, each arm 44 can pivot about a corresponding pin 35, fixed to the hoop 34, so that arm 44 may be folded back within the annular piece 30 when not in use, thereby permitting the device to be more compactly stowed.

In FIGS. 5 to 12, the securing member 50 is more specifically formed by elastic stretcher (securing member) 54, one end of which possesses a clip 55 whose shape corresponds to the section of the hoop on which it is clipped so that there is a relative movement of the clip relative to the hoop.

In the embodiment shown in FIGS. 5 and 6, the end of the stretcher with the clip 55 allows free rotation of hoop 54 while the other end of the stretcher 54 includes a hook 56 intended to be fixed to an angle-plate 23 which is attached to lug nut 24.

In the alternative embodiment shown in FIGS. 7 and 8, a clip 56 is fixed to supports 26 inserted at predetermined and regularly spaced positions between the lip 21 of the rim and the adjacent part 11 of the tire. As before, the clip 55 is dimensioned and position so as to allow free rotation of the hoop 34.

The embodiments shown in FIGS. 9 to 12 comprise in addition to the hoop 34 previously mentioned, a supplementary ring 36 centered about the same axis as the hoop 34.

Figure 9:
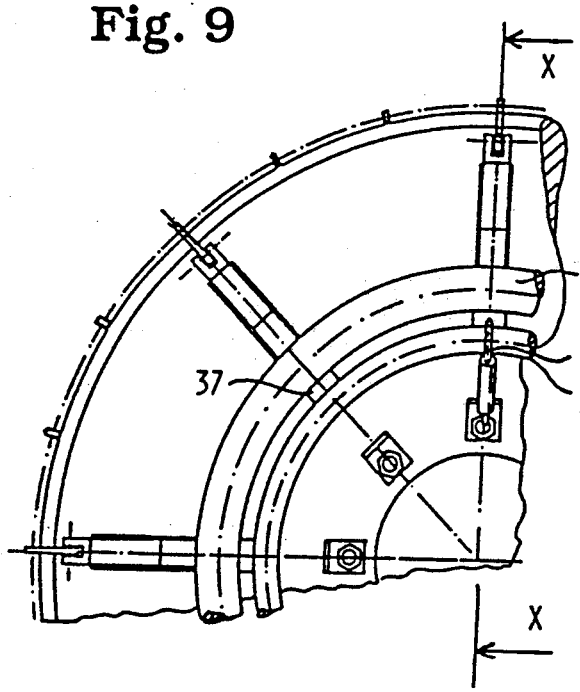
FIG. 9 is a partial lateral view of a wheel equipped with a third embodiment of a device according to the present invention, showing an alternative means of attaching the anti-skid device using restoring elements arranged between a supplementary ring fixed to the main ring and the wheel bolts.
Figure 10:
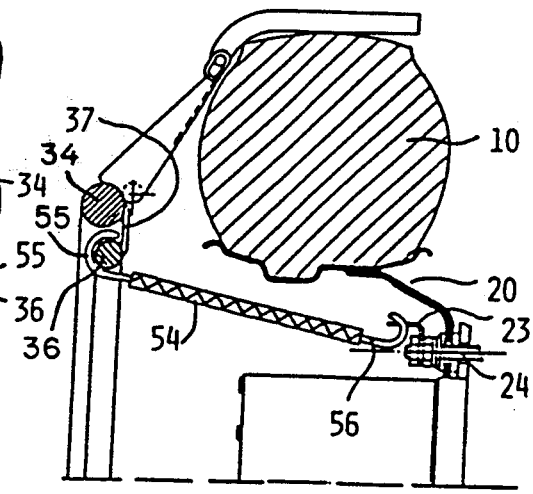
FIG. 10 is a section along X—X in FIG. 9.

In the alternative embodiment of FIGS. 9 and 10, the elastic stretcher 54 possesses at one end a clip 55 whose shape corresponds to the section of the supplementary hoop 36 on which it is clipped so that the hoop 36 can move freely. The other end of stretcher 54 possesses a clip 56 enabling it to be fixed to a plate 23 held n place by lug nuts 24. The supplementary hoop 36 is fixed to the hoop 34 by means of connecting elements 37 fixed at various points along the circumference of the hoop. It is also possible to fix this clip 56 in supports inserted between the lip of the rim and the tire.

Figure 11:
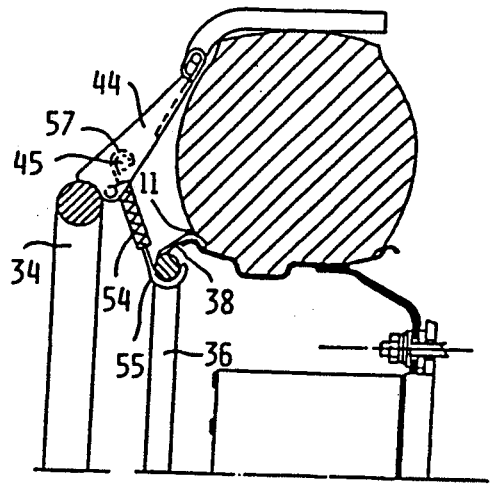
FIG. 11 is a partial section of an alternative embodiment, wherein the supplementary ring is fixed to the lip of the rim and the restoring elements are located between an arm and the supplementary ring.

In the alternative embodiment shown in FIG. 11, the supplementary hoop 36 is fixed to the rim by means of connecting elements 38 inserted between the lip 21 of the rim and the adjacent part 11 of the tire. The elastic stretcher 54 has a rounded clip 55 at one end matching the shape of the supplementary ring 36 along which it can slide. The other end of elastic stretcher 54 possesses a clip 57 which may be fixed to arm 44 with a cotter pin 45, for example.

Figure 12:
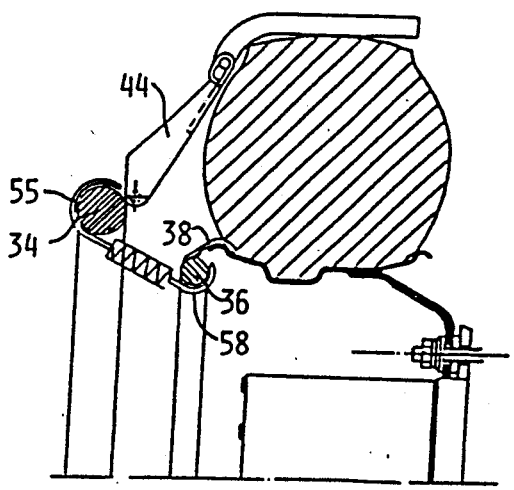
FIG. 12 is a partial section showing an alternative embodiment with restoring elements located between the principal and supplementary rings.

In the last alternative embodiment shown in FIG. 12, there is an annular piece 34 having radial arms 44 and a supplementary hoop 36, fixed to elements 38 for connection with the lip 21 of the rim. The two ends of the stretcher 54 are provided with rounded clips 55 and 58, both intended to slide respectively along the annular piece 31 and along the supplementary hoop 36.

The hoop 36 of the alternative embodiments of FIGS. 11 and 12 can be fixed at other points of the rim, for example in the lug nuts 24.

It should become obvious to those skilled in the art that this invention is not limited to the preferred embodiments shown and described. For example, while in the majority of alternative embodiments herein described the annular piece is of circular section, it would also be possible to consider producing a stamped annular piece possessing in section an arcuate part forming an annular rib, along which the securing members could slide.

Particularly beneficial results have been obtained when the majority of the component parts of the present invention such as the annular hoops, the radial arms, the chain guides, the fixing clips and plates are metal. In addition, the securing members may possess a part made from an elastomeric material or, in an alternative embodiment not shown in the drawing, a metal spiral spring.

What is claimed is:

1. An anti-skid device for a vehicle wheel having a hub comprising:
    at least a principal hoop member disposed about an axis of rotation of the wheel, said principal hoop member having an inner diameter greater than the outer diameter of the hub of the wheel;
    a plurality of radial connecting arms extending from said principal hoop member;
    a continuous anti-skid means attached to said connecting arms, said anti-skid means being disposed about the periphery of said wheel;
    a plurality of resilient securing members for positioning said anti-skid means over the periphery of the wheel, each securing member having at least one end slideably attached to said principal hoop member; and
    attaching means for at least indirectly attaching said securing members to a portion of said wheel.

2. The anti-skid device according to claim 1, wherein said plurality of radial connecting arms are arranged at regular intervals around said principal hoop member.

3. The anti-skid device according to claim 2, wherein said radial connecting arms are eight in number.

4. The anti-skid device according to claim 2, wherein the said radial connecting arms are articulated relative to the principal hoop member.

5. The anti-skid device according to claim 2, further comprising chain-guide elements which are inserted in the anti-skid means and which are fixed to the radial connecting arms.

6. The anti-skid device according to claim 1, wherein said attaching means for the members is fixed in apertures disposed in the rim of the wheel.

7. The anti-skid device according to claim 1, further comprising supports located between the rim and the tire for fixing said attaching means for the securing members to said wheel.

8. The anti-skid device according to claim 7, wherein said supports are S-shaped.

9. The anti-skid device according to claim 1, further comprising plates held in place by lug nuts for fixing said attaching means for the securing members to said wheel.

10. The anti-skid device according to claim 9, wherein said plates are angled relative to the axis of rotation of the wheel.

11. The anti-skid device according to claim 1, wherein the principal hoop member consists of a first hoop member and a second hoop member, concentrically disposed about the axis of rotation of said wheel.

12. The anti-skid device according to claim 11, further comprising a plurality of connecting elements for connecting said first and second hoop members.

13. The anti-skid device according to claim 11, wherein said attaching means for the securing members are slideably attached to said hoop member.

14. The anti-skid device according to claim 11, further comprising at least one connector fixing said second hoop member to said wheel, said securing members being slideably attached to said second hoop member.

15. The anti-skid device according to claim 11, wherein said first hoop member is hollow and said
second hoop member is rotatably disposed inside said first, hollow hoop member;
said first hollow member having an annular aperture disposed therein for receiving said securing members;
said securing members being attached to said second hoop member.

16. The anti-skid device according to claim 1, wherein said securing members are spaced at regular angular distances.

17. The anti-skid device according to claim 16, wherein each securing member includes an elastically deformable part formed at least one side into a curved clip.

18. The anti-skid device according to claim 16, wherein the securing members are six in number.

19. The anti-skid device according to claim 18, wherein said securing members comprise a material selected from the group consisting of vulcanized rubber and unvulcanized rubber.

20. The anti-skid device according to claim 18, wherein a portion each of said securing members comprise a spring means.

21. The anti-skid device according to claim 1, wherein said principal hoop member consists essentially of one single hoop member.

22. The anti-skid device according to claim 1, wherein said continuous anti-skid means comprises a pair of chains which are adapted to extend around the periphery of the wheel and which are connected to one another by a plurality of transverse bars.

23. An anti-skid device for a vehicle wheel comprising:
a first hoop member disposed about an axis of rotation of said wheel;
a plurality of radial connecting arms extending from said first hoop member;
an anti-skid means attached to said connecting arms;
said anti-skid mans being disposed about the periphery of said wheel;
a plurality of securing members positioning said anti-skid means over the periphery of the wheel;
a second hoop member fixed to a portion of said wheel;
said securing members being attached to at least one of said connecting arms at a first end and slideably attached to said second hoop member with a second end.

24. In combination:
a vehicle wheel having a hub, and
an anti-skid device for said vehicle wheel;
said anti-skid device comprising:
at least a principal hoop member disposed about an axis of rotation of the wheel, said principal hoop member having an inner diameter greater than the outer diameter of the hub of the wheel;
a plurality of radial connecting arms extending from said principal hoop member;
a continuous anti-skid means attached to said connecting arms;
said anti-skid means being disposed about the periphery of said wheel;
a plurality of resilient securing members for positioning said anti-skid means over the periphery of the wheel; each securing member having at least one end slideably attached to said principal hoop member; and
attaching means for at least indirectly attaching said securing members to a portion of said wheel.

25. The anti-skid device according to claim 24, wherein said continuous anti-skid means comprises a pair of chains which are adapted to extend around the periphery of the wheel and which are connected to one another by a plurality of transverse bars.

* * * * *